June 17, 1969
H. J. LANCETTE
3,450,096
GLASS FROSTING DEVICE
Filed Aug. 7, 1967
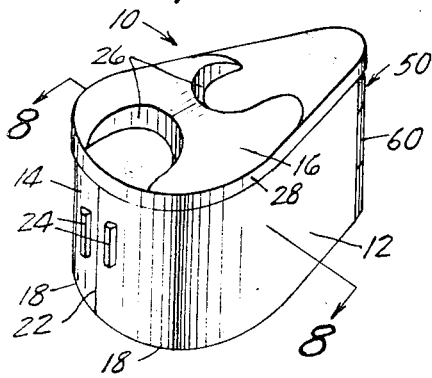
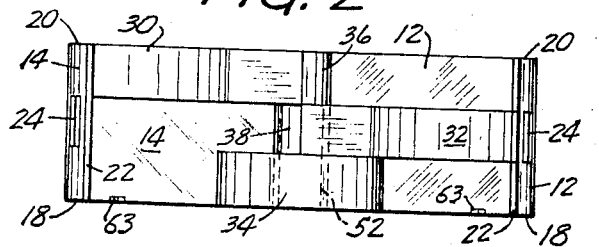
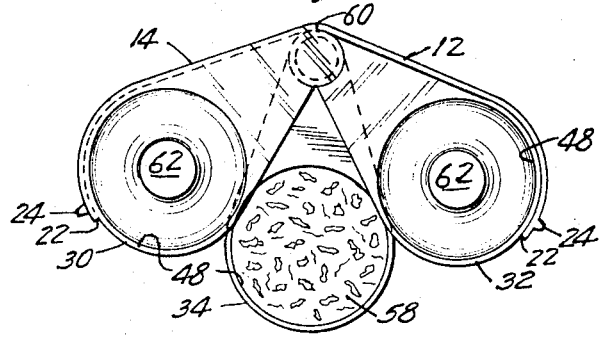
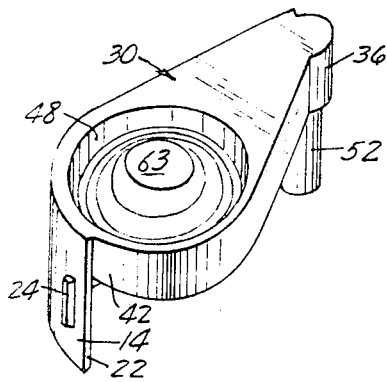
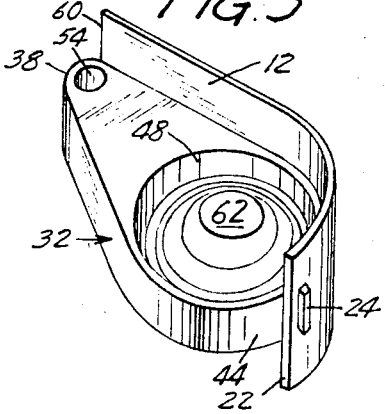
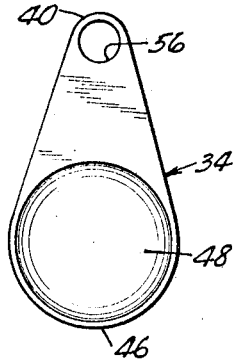
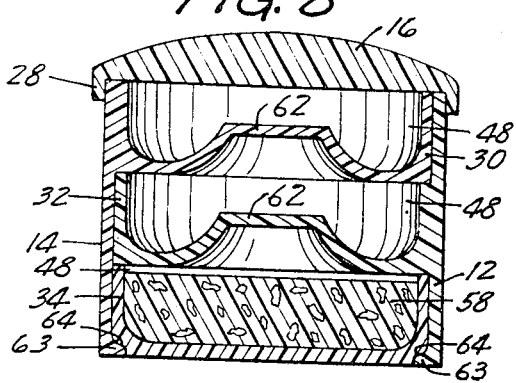
INVENTOR.
HENRY J. LANCETTE
BY
Donald M. Sell
ATTORNEY

United States Patent Office 3,450,096
Patented June 17, 1969

3,450,096
GLASS FROSTING DEVICE
Henry J. Lancette, 400 Holly St.,
St. Paul, Minn. 55102
Filed Aug. 7, 1967, Ser. No. 658,683
Int. Cl. B05c 3/02, 3/20, 3/09
U.S. Cl. 118—16     8 Claims

ABSTRACT OF THE DISCLOSURE

A device is provided for facilitating the frosting of the rims of glasses and other vessels from which beverages are to be drunk. The device comprises trays stacked normally one upon the other with each tray having a shallow, bowl-like depression formed therein for receiving a frosting ingredient. The trays are swingably attached to one another so that they can be swung away from one another to open the device and expose the bowl-like depressions of each tray in the stack for pressing of a drinking vessel rim thereagainst to frost the same. The device includes at least three trays stacked one upon the other with the uppermost two of the trays having supporting sidewalls formed thereon for stabilizing the device and maintaining the trays in staggered relation when the device is opened and the trays are in position for frosting drinking vessel rims.

---

The present invention relates to a device for frosting the rims of glasses and other drinking vessels.

In the dispensing of many beverages it is common to wet the rim of the drinking vessel with a flavoring, such as lemon, lime, or the like and then to frost the rim so wetted with salt or sugar. The usual practice is to take a piece of orange, lemon, lime or other fruit and pass it around the rim of the drinking vessel and then spin the vessel in a receptacle containing salt or sugar or the like. The variations in this technique are numerous and no convenient device has heretofore been provided to speed up and make consistent the frosting of the vessel rims. The general results are inconsistent frosting from glass to glass and even along the same rim, inconvenient, or unsanitary equipment, and excessive time spent in frosting operations.

A primary object of this invention is to provide a glass frosting device that is so constructed as to make it convenient, stable, readily cleanable and trouble-free, which device will enable standardization in the practice of frosting glass rims, provide a sanitary frosting environment and greatly facilitate the speed and efficiency with which such rims may be frosted.

It is another object of this invention, ancillary to the primary object, to provide a glass frosting device which may be conveniently opened and closed by the user thereof and wherein the sidewalls of the device serve as stabilizing and supporting means and as housing closures to protect the contents of the device in its closed position.

A further object of the invention is to provide a device as set forth in the preceding objects which further includes a cover to maintain the entire interior of the device closed and to prevent inadvertent opening of the device without removal of such cover.

The foregoing, as well as other objects and advantages which will appear as the description proceeds, are obtained by this invention which is described in detail with reference to the accompanying drawings wherein:

FIGURE 1 is a perspective view of the glass frosting device in closed position with the lid or cover thereon;

FIGURE 2 is a front view of the device in its open position with the cover removed;

FIGURE 3 is a top view of the device as illustrated in FIGURE 2 in its open position;

FIGURE 4 is a perspective view of the uppermost tray of the device;

FIGURE 5 is a perspective view of the middle tray of the device;

FIGURE 6 is a top view of the lowermost tray of the device; and

FIGURE 7 is a perspective view of a sponge for use with the device;

FIGURE 8 is a cross-sectional view of the device taken substantially along the plane of section line 8—8 of FIGURE 1.

Referring now particularly to FIGURE 1, the device is designated in its entirety by the numeral 10 and is seen, in its closed position, to comprise enclosing sidewalls 12 and 14 and a lid or cover 16. Each of the sidewalls 12 and 14 has a horizontal bottom edge 18, a horizontal top edge 20 (FIGURE 2) and a vertical front edge 22, the front edge of each of the sidewalls 12 and 14 meeting to close the housing. Mounted exteriorly on each of the sidewalls 12 and 14 adjacent their meeting front edges 22 when the device is closed are pulls or similar elements 24 which may be grasped to swing the sidewalls 12 and 14 away from one another. The lid or cover 16 is so constructed as to have a raised central portion with finger gripping recesses 26 formed therein to facilitate its removal from and application to the device. Around the rim of the lid 16 is a depending flange 28 which fits down over the top edge 20 of each of the sidewalls 12 and 14 to maintain the device closed. This flange 28 of the lid 16 is designed to provide a frictional fit over the upper edges 20 of the sidewalls 12 and 14 so that the device does not inadvertently fall open so long as the lid is in place and to require some force to lift the lid upon opening of the device.

As illustrated primarily in FIGURES 2 and 3 the device 10, in the embodiment shown, consists of three trays. The uppermost tray is designated by the numeral 30, the middle tray by the numeral 32, and the lowermost tray by the numeral 34. When the device is open, as is clearly apparent from FIGURES 2 and 3, the trays 30, 32 and 34 are in staggered relation with one another so that the top face of each of the trays is exposed. The sidewall 12 is attached to, or integral with, the middle tray 32 and extends both above and below this tray whereas the sidewall 14 is attached to, or integral with, the uppermost tray 30 and depends therefrom. Both sidewalls 12 and 14 terminate on the same horizontal plane with the bottom of the lower tray 34. Thus, when the device is in its open position as shown in FIGURES 2 and 3 the bottom edges 18 of the sidewalls 12 and 14 and the bottom of the tray 34 serve to support and stabilize the device.

Referring particularly to FIGURES 3–6 each of the trays 30, 32, and 34 is illustrated as having a narrow inner end 36, 38, and 40 respectively from which the sidewalls diverge and subsequently converge to a smoothly rounded outer end 42, 44 and 46, respectively. The wider outer end portion of each tray is provided with a shallow, bowl-like depression 48, all being generally of the same size and shape. Means 50 is provided for pivotally attaching the trays to one another at their inner ends so that the trays may be swung from their closed position wherein they are stacked vertically one upon another to their open position wherein they are vertically staggered with respect to one another. This pivotal means 50 comprises a post 52 depending from the inner end of the uppermost tray 30 which passes through post holes 54 and 56 respectively, of the middle tray 32 and the lowermost tray 34, respectively. This post 52 is shown in dotted outline in FIGURE 2, passing through the post holes 54 and 56, respectively, at the inner ends 38 and 40, respectively, of the middle and lowermost trays 32 and 34.

The device is designed so that both granular and liquid frosting ingredients such as sugar, salt, or liquid flavorings such as those of lime, orange or lemon may be placed into the bowl-like depressions 48 of each of the trays. For the liquid frosting ingredients, a sponge such as illustrated at 58 in FIGURE 7 may be saturated and fitted into the bowl-like depressions 48 to contain the rim wetting liquid to which the granular ingredient sticks to complete the frosting. Thus, when the device is in its open position as shown in FIGURE 3, assuming the sponge 58 is in the lowermost tray 34, the glass rim would be first spun in the sponge to wet it with the liquid saturating the sponge and thereafter spun in either of the upper trays 30 and 32 respectively to frost the rim with the salt or sugar, or the like.

Referring particularly to FIGURES 1 and 3 it will seem that the sidewall skirts 12 and 14 of the device have parallel vertical back edges 60 which meet as the sidewalls are opened to spread the trays apart from one another (note FIGURE 3 to show the meeting back edges 60) whereby the amount with which the two uppermost trays may be swung away from one another is limited to something less than 180°, e.g. between about 100° and 180°, to provide the utmost stability of the device when open for use while still exposing the bowl-like depressions 48 of each of the trays.

Referring particularly to FIGURE 8, two other advantageous features of the device are illustrated. The two uppermost trays, although it would be any one or two of the three trays, are each provided with a raised center portion 62 to position the glass for frosting with the granular ingredient. The raised center portion is in the form of a flat disc-like surface joined to the bottom of the trough formed therearound by smoothly curved, readily cleaned surfaces. Adjacent its bottom edge each of the sidewalls 12 and 14 is provided with a detent 63 which fits in socket 64 to hold the device together in its closed position.

As will be understood by those schooled in the art from the foregoing, a convenient, practical, readily cleaned glass frosting device is provided which takes up a minimum of space, maintains the glass frosting ingredients in a protected environment when closed to prevent moisture loss, etc., which is stable and sturdy in use when in open position, and which is comprised of a small number of readily disassembled parts.

What is claimed is:

1. A glass frosting device for facilitating frosting with flavoring ingredients the rims of vessels from which beverages are to be drunk, said device comprising trays stacked normally one upon the other, each tray having a shallow, bowl-like depression provided in the top therein for receiving a glass frosting ingredient, means swingably attaching said trays to one another whereby they can be swung away from one another to open the device and expose the bowl-like depression of each tray in the stack for pressing of a drinking vessel rim thereagainst to frost the same, said device having at least three trays stacked one upon the other, and the uppermost two of said trays having supporting means attached thereto for stabilizing said device and maintaining said trays in staggered relation when said device is opened and the trays are in position for frosting drinking vessel rims.

2. The glass frosting device of claim 1 wherein said swingably attaching means comprises a post about which said trays swing, each tray having the side walls thereof diverging from the inner end thereof toward the outer end, said trays being swingably mounted by said post at their inner ends.

3. The glass frosting device of claim 2 wherein said supporting means comprises a side wall extension on each of the outer side walls of the two said upper trays, each of said extensions depending downwardly to the approximate level of the bottom of the lowermost tray, whereby the device is firmly supported against tipping when open.

4. The glass frosting device of claim 3 wherein said extensions are so constructed as to provide vertical meeting edges to completely enclose all but the top of said device when said device is closed and the trays are in their vertically aligned stacked relationship.

5. The glass frosting device of claim 4 wherein said device includes a lid for closing the top of said device when said device is closed.

6. A glass frosting device for frosting the rims of drinking glasses comprising three trays normally stacked in vertically aligned relation when said device is closed, each of said trays being generally flat with a narrow inner end from which side walls diverge and subsequently converge to a smoothly rounded outer end, means pivotally attaching said trays to one another at their inner ends so that the top face of each tray is exposed as the device is opened and the trays are swung away from one another, the outer side wall of each of the two uppermost trays being extended to provide an enclosing housing for the device in its closed position and a stabilizing supporting means for the device in its open position, such extended side wall having parallel top and bottom horizontal edges extending the length thereof, and a vertical front edge, the top and bottom edges of each side wall being on the same horizontal plane, the vertical front edge of each side wall meeting when said device is in closed position, means on the outer face of each extended side wall of said two uppermost trays to open said housing and swing said two uppermost trays away from one another, said device in its open position being adapted to be supported and stabilized by the bottom of the lowermost tray and the bottom edge of each of said extended side walls, each of said trays having a shallow, bowl-like depression therein for the reception of glass frosting ingredients therein.

7. The device of claim 6 wherein said pivotally attaching means comprises the two lower trays having aligned openings therein at their inner ends, the top tray having a post depending from the inner end thereof passing through said aligned openings and swingably mounting the two lower trays thereon.

8. The device of claim 7 including a cover adapted to fit over the top edges of said extended side walls and cover the top of said device when the device is closed and to prevent inadvertent opening of said device.

References Cited

UNITED STATES PATENTS 3,327,682   6/1967   Garay ---------------- 118—16

WALTER A. SCHEEL, Primary Examiner.

JOHN P. McINTOSH, Assistant Examiner.

U.S. Cl. X.R.

118—26